US011551245B2

(12) United States Patent
L'Huillier et al.

(10) Patent No.: US 11,551,245 B2
(45) Date of Patent: *Jan. 10, 2023

(54) DETERMINING TRANSACTIONAL NETWORKS USING TRANSACTIONAL DATA

(71) Applicant: Groupon, Inc., Chicago, IL (US)

(72) Inventors: Gaston L'Huillier, Cambridge, MA (US); Evan MacMillan, Los Altos, CA (US); Francisco Larrain, Palo Alto, CA (US); Ricardo Zilleruelo, Mountain View, CA (US); Sebastian Kreft, San Francisco, CA (US)

(73) Assignee: GROUPON, INC., Chicago, IL (US)

(*) Notice: Subject to any disclaimer, the term of this patent is extended or adjusted under 35 U.S.C. 154(b) by 502 days.

This patent is subject to a terminal disclaimer.

(21) Appl. No.: 16/805,343

(22) Filed: Feb. 28, 2020

(65) Prior Publication Data

US 2020/0273053 A1  Aug. 27, 2020

Related U.S. Application Data

(63) Continuation of application No. 13/481,407, filed on May 25, 2012, now Pat. No. 10,580,022.

(Continued)

(51) Int. Cl.
*G06Q 30/02* (2012.01)
*G06Q 50/00* (2012.01)

(52) U.S. Cl.
CPC ..... *G06Q 30/0204* (2013.01); *G06Q 30/0201* (2013.01); *G06Q 50/01* (2013.01)

(58) Field of Classification Search
None
See application file for complete search history.

(56) References Cited

U.S. PATENT DOCUMENTS 7,472,072 B2   12/2008   Kowalchuk
7,672,865 B2   3/2010    Kumar et al.
(Continued)

FOREIGN PATENT DOCUMENTS

CN        1592909 A  *  3/2005  ......... G06Q 30/0611

OTHER PUBLICATIONS

M. Bizhani and M. J. Tarokh, "Behavioral segmentation of bank's Point-of-Sales using RFM approach," Proceedings of the 2010 IEEE 6th International Conference on Intelligent Computer Communication and Processing, 2010, pp. 81-86, doi: 10.1109/ICCP.2010.5606461. (Year: 2010).*

(Continued)

*Primary Examiner* — Mehmet Yesildag
(74) *Attorney, Agent, or Firm* — Alston & Bird LLP

(57) ABSTRACT

Various methods are provided for determining transactional networks using transactional data. One example method may comprise receiving a set of transactional data associated each of a plurality of customers, the set of the transactional data comprising a plurality of ordered lists of elements, each ordered list of elements defining a transaction of a plurality of transactions, the ordered list of elements comprising information identifying a particular customer from the plurality of customers, a merchant, and a timestamp, for each particular customer from the plurality of customers, generating a network, each generated network comprising one or more merchant nodes, a plurality of customer nodes, one or more merchant-customer edges between at least one of the one or more merchant nodes and at least one of the plurality of customer nodes, and one or more customer-customer edges between two or more customer nodes.

20 Claims, 7 Drawing Sheets

Related U.S. Application Data

(60) Provisional application No. 61/491,154, filed on May 27, 2011.

(56) References Cited

U.S. PATENT DOCUMENTS

| | | | |
|---|---|---|---|
| 7,835,940 B2 | 11/2010 | Kowalchuk | |
| 10,366,421 B1 | 7/2019 | Wu et al. | |
| 2002/0052782 A1 | 5/2002 | Landesmann | |
| 2002/0103746 A1* | 8/2002 | Moffett, Jr. | G06Q 40/04 |
| | | | 705/37 |
| 2002/0116281 A1 | 8/2002 | Costello et al. | |
| 2003/0158776 A1 | 8/2003 | Landesmann | |
| 2004/0249700 A1 | 12/2004 | Gross | |
| 2006/0010029 A1* | 1/2006 | Gross | G06Q 30/0201 |
| | | | 705/7.29 |
| 2006/0212355 A1* | 9/2006 | Teague | G06Q 30/0214 |
| | | | 705/14.19 |
| 2006/0235810 A1* | 10/2006 | Wen | G06F 16/951 |
| | | | 706/45 |
| 2007/0100680 A1 | 5/2007 | Kumar et al. | |
| 2007/0226248 A1* | 9/2007 | Darr | H04L 67/535 |
| | | | 707/999.102 |
| 2009/0094095 A1 | 4/2009 | Slaney et al. | |
| 2009/0164308 A1 | 6/2009 | Kowalchuk | |
| 2009/0307049 A1* | 12/2009 | Elliott, Jr. | G06Q 40/00 |
| | | | 705/7.29 |
| 2010/0211450 A1 | 8/2010 | Landesmann | |
| 2011/0137994 A1* | 6/2011 | Kumar | G06Q 30/02 |
| | | | 709/204 |
| 2013/0110835 A1 | 5/2013 | He | |
| 2015/0278221 A1 | 10/2015 | Perry, III | |

OTHER PUBLICATIONS

U.S. Appl. No. 13/481,407, filed May 25, 2012, U.S. Pat. No. 10,580,022, Issued.

* cited by examiner

DETERMINING TRANSACTIONAL NETWORKS USING TRANSACTIONAL DATA

RELATED APPLICATIONS

This application claims priority to U.S. Provisional Patent Application Ser. No. 61/491,154, filed May 27, 2011, which is also incorporated herein by reference in its entirety.

TECHNICAL FIELD

The present description relates to how to efficiently and effectively to identify early adopters and potential influencers for merchants. More specifically, the present description relates to a way to determine an early adopter and/or potential influencer ranking among customers using a time-based transaction network and using a scoring function.

BACKGROUND

Merchants desire a way to determine the customers to offer deals that return the greatest return on investment. Currently, merchants offer deals to customers without the ability to determine the return the merchant should expect to realize from the deals offered.

SUMMARY

The early adopters and potential influencers (EAPI) system, method and computer-readable medium obtain a list of transactional data, determine transactional networks using gathered transactions and external data, and score customers identified in transactional activities in the transactional networks. The transactional data may include commercial transactions that identify one or more purchases of products and/or services by a customer from a merchant and/or one or more subscriptions. The merchant may refer to a company that offers a product and/or service for purchase and/or lease.

The EAPI system uses transactional networks to construct networks (e.g., network diagrams) that provide customers information and transactions of the customers over time. The transactional networks include weighted and directed, weighted and non-directed, non-weighted and non-directed networks computed with information regarding previous transactional activities of transaction generating entities (e.g., customers, public and private companies, non-profit organizations, and governmental institutions).

The previous transactional activities include previous behavioral data gathered using a manual or automatic information system. The behavioral data includes information from which behavior properties of the transaction generating entity can be extracted using a pattern recognition algorithm. The pattern recognition algorithm may include and/or relates to unsupervised learning, supervised learning, semi-supervised learning, reinforcement learning, association rules learning, Bayesian learning, solving for probabilistic graphical models, among other computational intelligence algorithms that may use an interactive process to extract patterns from data. The behavior properties refer to information that associates actions of the customer over time and/or space (e.g., geographical information) from the transaction generating entity.

The space refers to a geographical space denoted by latitude and longitude coordinates, and/or a network space with relationship between customers. The network space refers to respective social networks extracted from social networking systems.

The social networking systems include online social network websites, virtual communities of practice, and virtual communities of interest, among other social network services. The transaction network analysis framework may identify potential influencers and early adopters related to each other based on respective relationships of the potential influencers and early adopters with transactions with the merchants. The transactional data may include commercial transaction information that relates to a purchase of a product and/or service from a merchant and/or a subscription.

The EAPI system distinguishes between different objects within a network. The objects include nodes of the network, using general object ranking algorithms. The EAPI system computes linking analysis measures for the customers and the merchants, identifies most influential customers among the customers, and identifies merchants trending among the customers identified as most influential. The general object ranking algorithms rank objects in multi-modal networks including pop-rank. The linking analysis measures include centrality measures and/or related network analysis measures that provides analysis identifying differences between the nodes within the network. Centrality measures measure a nodes importance or prominence in the network. The more central a node is in a network the more significant the node is as an influencer (e.g., aid in the spread of information about a merchant by a customer and the goodwill of the merchant).

The EAPI system computes centrality measures from transactional data for transactional networks, classifies customers into different segments by applying data clustering strategies and pattern recognition algorithms on the transactional data, and clusters the customers according to the transactional data.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

The early adopters and potential influencers (EAPI) system, method and computer-readable medium provide a way to compute an influence and early adoption ranking from a list of customers, using the information gathered from a transaction tracking system. The influence and early adoption ranking and/or score can be associated with respect to a merchant and/or product over time.

Using information collected, for example using Application Programming Interfaces (APIs) from online social networking websites and other data sources (e.g., third party applications), the EAPI system characterizes the information associated with the transactions, and extends the analysis of the influencers. The EAPI system may provide characterizations in terms of customers, transactions and products and/or merchants.

The EAPI system may use spatial information (e.g., geographical information) and/or other dimensions to enhance the scoring of customers as potential early adopters and potential influencers. The EAPI system clusters transactions, customers, and/or merchants to refine the scoring for early adoption or potential influence. The EAPI system may also use information such as the social network for a customer and/or merchant, to determine further improvements on the influence and early adoption ranking computation.

Influence is "the capacity of causing an effect in indirect or intangible ways," as defined according to Merriam-Webster. The EAPI system associates the computed influence and early adoption ranking with an influence proxy, where the score of the influence proxy score may be interpreted as the degree of influence with respect to fellow shoppers (e.g., customers).

The EAPI system may use a transaction tracking system to gather necessary data, in which the data may be gathered from various sources (e.g., merchant processors, acquiring banks, issuing banks and retailers direct feeds and credit card networks) using different data collection mechanisms.

Figure 1:
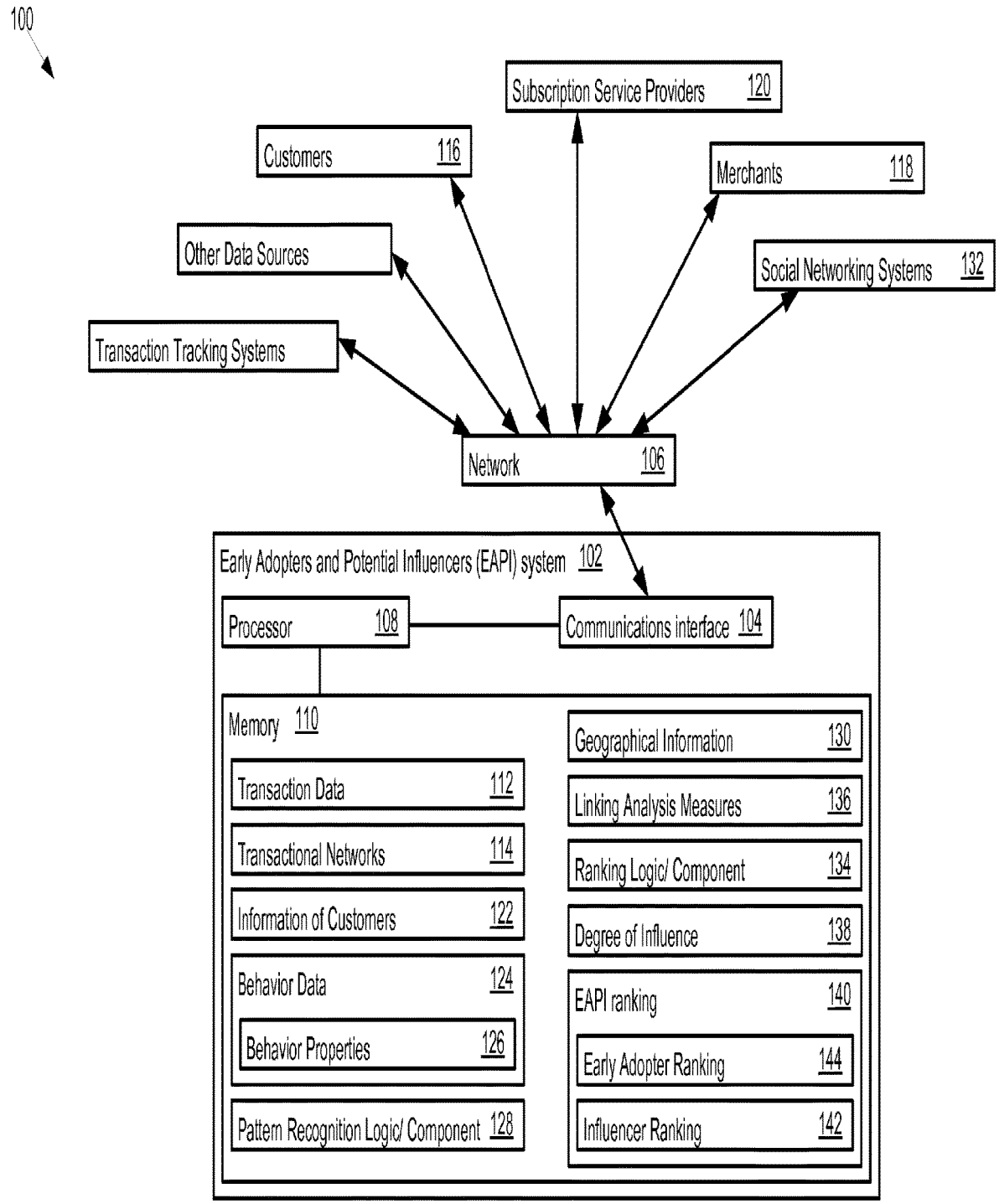
FIG. 1 shows the early adopters and potential influencers (EAPI) system configuration.

FIG. 1 shows the EAPI system configuration 100. The EAPI system configuration 100 includes an EAPI system 102. The EAPI system 102 includes a communications interface 104 used to communicate with various components of the EAPI system configuration 100 through a network 106 (e.g., the Internet). The communications interface 104 is coupled to a processor 108 coupled to a memory 110. The EAPI system 102 obtains a list of transactional data 112, determines transactional networks 114 using gathered transactions and external data, and scores customers 116 identified in transactional activities in the transactional networks 114. The transactional data 112 may include commercial transactions that identify one or more purchases of products and/or services by a customer 116 from one or more merchants 118 and/or one or more subscriptions 120. The merchant 118 may refer to a company that offers a product and/or service for purchase and/or lease.

In one embodiment, the EAPI system 102 generates, for one, some or all customers scoring equal to or greater than a scoring threshold value, a preprocessed transaction for a merchant, wherein the scoring threshold value determines the influence of the customer with respect to other customers. The preprocessed transaction may include customer information that a merchant may use to expedite processing of a sales transaction with the customer, including customer identifiers, payment methods, and discounts and deals the customer is eligible to use for purchases. The EAPI system 102 processes the preprocessed transaction for the merchant when the customer commences a transaction with the merchant. Processing the preprocessed transaction reduces the elapsed time for the customer to complete the commenced transaction.

In another embodiment, the EAPI system 102 may determine for the customer scoring equal to or greater than the scoring threshold value, when to generate a preprocessed transaction for a merchant by evaluating a time period in which the customer is expected to commence a transaction for a product or service offered by the merchant, and/or evaluating a geographical distance to the merchant within which the customer is expected to be during another time period. The EAPI system 102 may offer the customer a deal with a merchant based on identifying the merchant with whom the customer scoring is equal to or greater than a scoring threshold value, wherein the scoring threshold value determines the influence of the customer with respect to other customers.

The EAPI system 102 may also calculate a number of influenced customers influenced by the customers scoring equal to or greater than a scoring threshold value identified as the influencers for a merchant, identify a least number of the influencers that provide the greatest number of influenced customers, and offer the least number of the influencers a deal with a merchant. The EAPI system 102 may alternatively calculate a number of influenced customers influenced by the customers scoring equal to or greater than the scoring threshold value identified as the influencers for a merchant, identify a least number of the influencers that provide the greatest number of influenced customers common to the least number of the influencers, and offer the least number of the influencers a deal with a merchant. The EAPI system 102 may further calculate a number of influenced customers influenced by the customers scoring equal to or greater than the scoring threshold value identified as the influencers for a merchant, identify a least number of the influencers that provide the greatest number of influenced customers unique to each of the least number of the influencers, and offer the least number of the influencers a deal with a merchant The EAPI system 102 uses the transactional networks 114 to construct networks (e.g., network diagrams) that provide customers 122 information and transactions of the customers over time. The transactional networks 114 may include weighted and directed, weighted and non-directed, non-weighted and non-directed networks computed with information regarding previous transactional activities of transaction generating entities (e.g., customers, public and private companies, non-profit organizations, and governmental institutions).

The previous transactional activities include previous behavioral data 124 gathered using a manual or automatic information system. The behavioral data 124 includes information from which behavior properties 126 of the transaction generating entity can be extracted using one or more pattern recognition algorithms 128. The pattern recognition algorithms 128 may include and/or relate to unsupervised learning, supervised learning, semi-supervised learning, reinforcement learning, association rules learning, Bayesian learning, solving for probabilistic graphical models, among other computational intelligence algorithms that may use an interactive process to extract patterns from data. The behavior properties 126 refer to information that associates actions of the customer over time and/or space (e.g., geographical information 130) from the transaction generating entity.

The space refers to a geographical space denoted by latitude and longitude coordinates, and/or a network space with relationship between customers 116. The network space refers to respective social networks extracted from social networking systems 132.

The social networking systems 132 include online social network websites, virtual communities of practice, and virtual communities of interest, among other social network services. The transaction network analysis framework used by the EAPI system 102 may identify potential influencers and early adopters related to each other based on respective relationships of the potential influencers and early adopters with transactions with the merchants 118.

The EAPI system distinguishes between different objects within a network. The objects include nodes of the network, using general object ranking algorithms 134. The EAPI system computes linking analysis measures 136 for the customers and the merchants, identifies most influential customers among the customers, and identifies merchants trending among the customers identified as most influential. The general object ranking algorithms rank objects in multi-modal networks including pop-rank. Pop-rank is a method that extends the page-rank towards multi-graphs with different weights and relationships. The linking analysis measures 136 include centrality measures and/or related network analysis measures that identify differences between the nodes within the network. Centrality measures measure a nodes importance or prominence in the network. The more central a node is in a network the more significant the node is as an influencer (e.g., aid in the spread of information about a merchant by a customer and the goodwill of the merchant).

The EAPI system computes centrality measures from transactional data for transactional networks, classifies customers into different segments by applying data clustering strategies and pattern recognition algorithms on the transactional data, and clusters the customers according to the transactional data.

The EAPI system uses one or more algorithms to determine the degree of influence 138 for customers. The EAPI system may use the degree of influence 138 to determine the influence and early adoption rankings 140 for the customers. The influence and early adoption rankings may include multiple components, including an influence ranking component 142 and an early adoption ranking component 144.

Figure 2:
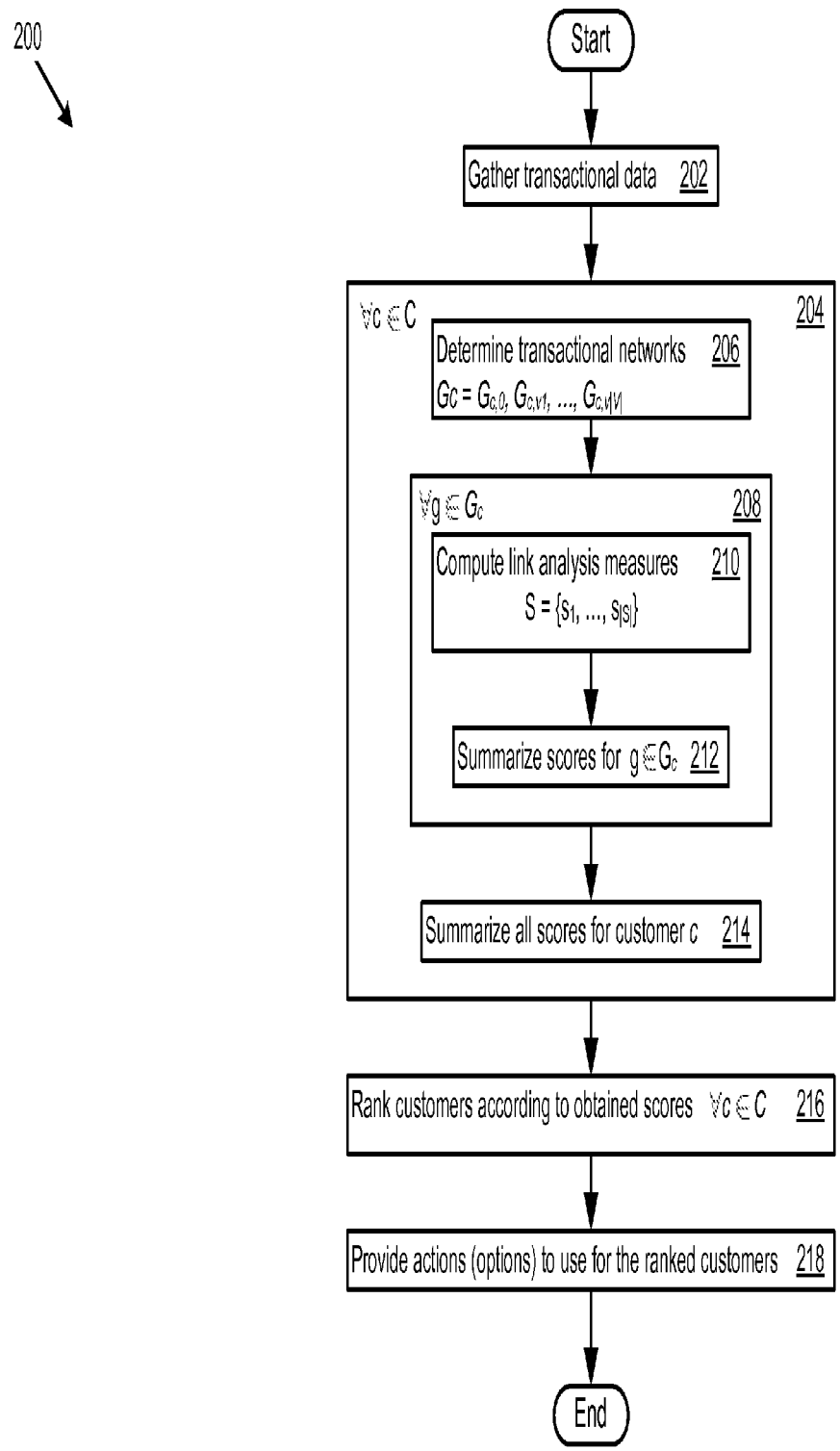
FIG. 2 shows logic flow the EAPI system may use to determine the degree of influence for customers.

FIG. 2 shows logic flow 200 the EAPI system may use to determine the degree of influence for customers. The transaction tracking system may gather information using at least a transaction date d, merchant identifier m, and customer identifier c (202). The EAPI system uses transaction data as input, and extended analysis of the transaction data with a set of attributes $V=\{v_1, \ldots, v_{|V|}\}$. Each transaction may be determined by the tuple $t=\{d, c, m, V\}$, where $|V|>=0$. The EAPI system may substitute merchants with products information to accurately compute the influence and early adoption ranking (e.g., influence score) that a customer has with respect to other customers. The influence and early adoption ranking may include multiple components, including an influence ranking component and an early adoption ranking component.

The information used to determine the influence score is based on a set of tuples $T=\{t_1, \ldots, t_{|T|}\}$ that may be gathered using transaction collection systems. Using tuples T, the EAPI system determines a collection of customers $C=\{c_1, \ldots, c_{|C|}\}$ by processing the set of transactions T ordered with respect to customers $c \in C$, where c is an element of the set C. The EAPI system determines with the transactions a set of merchants $M=\{m_1, \ldots, m_{|M|}\}$ and a time series for each information set and a combination of the customers, merchants, merchants for a customer, and customers for a merchant.

The EAPI system uses one or more algorithms to determine the influence degree of customers. The EAPI system computes, for one, some, or each customer, transaction networks with the information available from the transaction tracking system. The EAPI system uses previously computed networks to compute rankings for each customer. The EAPI system summarizes the computed rankings with information fusion strategies, in order to compute an overall score for the influence and early adoption for the customers. The overall score is used to rank the customers and determine the influence and early adoption influence proxy.

The EAPI system determines for each customer c a baseline transaction network $G_{c,0}=(N_{c,C}, N_{c,M})$ associated with each customer's transactions. The EAPI system builds the transaction network using a multi-modal network architecture which analyzes a set of nodes $N_c=(N_{c,C}, N_{c,M})$ with both customers ($N_{c,C}$) and merchants ($N_{c,M}$). The EAPI system determines the edges by the interaction between customers and merchants.

If a customer $c \in C$ generates a transaction with a merchant $m \in M$, the EAPI system adds a directed edge $e_{cm}$ to the network. The edge is directed towards customer c taking as origin the merchants to which the EAPI system tracks a transaction.

For each customer, the EAPI system computes a fellow buyers set $B_c$ which represents a set of customers who generated a transaction in merchant m but after customer c. For customers in $B_c$, the EAPI system determines directed edges that the EAPI system adds to the network if and only if the transactions of the directed edges are after the one generated by customer c. The EAPI system analyzes the direction of the edge from the customer to the merchants where a transaction was generated.

The EAPI system analyzes the previously presented network as the baseline network, and analyzes weights as the frequency of transactions that customer c has with merchant m.

For each customer (204), the EAPI system uses the vector of attributes $V_c$ to extend the previous graph with richer information and a more accurate representation of the transaction network. For each attribute, the EAPI system uses the information regarding the component of the attribute $v \in V_c$, as a weight factors for the edges in $E_c$. The EAPI system builds, for each $v \in V_c$, a new network $G_{v,c}=(N_c, E_{v,c})$.

As mentioned previously, different weights can be determined according to different types of information available represented by $v_i \in V_c$. If $v_i$ is a transactional information source that states a degree which is proportional to the value of the transaction (e.g., the amount), the EAPI system weights the edge $e_{c,m}$ with $v_i$. If the attribute is a set of coordinates, the EAPI system determines the weights of the edge using spatial-based criteria. As an example, if $v_i$ is associated with the coordinates of merchants, the EAPI system may analyze the weight as the inverse of the distance with respect to the following transaction if and only if the transaction is committed in a different merchant (e.g., the longer the distance, the smaller the influence that a customer could bring nearby that area).

The EAPI system uses a fusion of ranking algorithms to analyze previous representations of the transaction networks. For each customer, the EAPI system determines a set of networks $G_c=\{G_{c,0}, G_{c,v1}, \ldots, G_{c,v|V|}\}$ (206). For each network in $G_c$ (208), the EAPI system computes a link analysis score method s for each merchant m and represents the link analysis score method s by set $S=\{s_1, \ldots, s_{|S|}\}$ (210). The link analysis score methods used by the EAPI system may include pagerank, weighted pagerank, HITS hubs, HITS centrality, weighted HITS, clustering coefficient, and/or eigenvector centrality. Hyperlink-Induced Topic Search (HITS) (also referred to as hubs and authorities) is a link analysis algorithm that rates web pages. HITS centrality provides a list of authority and hub centralities for the vertices of a graph.

The EAPI system computes the link analysis measures, and uses an information fusion criteria $F_s: R^{|S|} \to R$ to summarize the scoring information and final representation of the degree of influence that the customer c has over a particular transactional network $g \in G_c$. The information fusion criteria denote a new score that is associated directly with a network, computed for the transactional networks $g \in G_c$ (212).

For the summarized scores obtained in each graph, the EAPI system may use another information fusion criteria $F_g: R^{|Gc|} \to R$ to determine the degree of influence and early adoption that a customer has over other customers (214).

The EAPI system uses previously computed networks to compute rankings for each customer. The EAPI system summarizes the computed rankings with information fusion strategies, in order to compute an overall score for the influence and early adoption for the customers (216). The overall score is used to rank the customers and determine the influence and early adoption influence proxy.

The relevance and accuracy of the computations computed by the EAPI system is directly related to the set of weighted representations computed for the transaction network $G_{c,v1}, \ldots, G_{c,v|V|}$, and the set of centrality measures $s \in S$ analyzed. Also, the EAPI system accepts external influence ratings in order to complement the final scoring computed by the EAPI system. If for each merchant, an external influence scoring system (e.g., delivered by an online social media analysis tool) is available that provides an external influence score, the EAPI system may analyze the external influence score as a new parameter in the set of link analysis measures S, and integrate into the EAPI system by information fusion functions.

The EAPI system provides actions (e.g., options) for the customers based on the customer rankings (218). The actions (e.g., options) provided by the EAPI system may include offering deals to the customers with the greatest influence (e.g., degree of influence) and/or early adoption ranking.

The EAPI system may use an influencer ranking threshold and/or early adopter ranking threshold to determine the customers to whom to offer deals. For example, a promotion system may receive as an input the influencer ranking threshold and/or the early adopter ranking threshold. The promotion system may use the influencer ranking threshold and/or the early adopter ranking threshold (either alone or in combination with other attributes of the customer) in order to evaluate whether to send a promotion to the specific customer. In one embodiment, the evaluation may include an expectation value that the specific customer will accept the promotion if offered. In another embodiment, the evaluation may include an expected revenue generated from the specific customer (which may comprise a multiplication of the expectation value that the specific customer will accept the promotion if offered with the amount of revenue generated by the specific customer using the promotion). In still another embodiment, the evaluation may include an expected amount of revenue generated from the specific customer as well as other customers. As discussed below, the EAPI system may determine a multiple of the return on investment (ROI). This multiple may be used to determine an expectation value of revenue generated from the specific customer as well as other customers influenced by the specific customer. The EAPI system may further determine the customers that will complete transactions with merchants regardless of whether the customer is offered a deal so that the merchant may decide whether to offer the customer a deal anyway because the customer is an influencer and/or early adopter. In one embodiment, the promotion system is separate from the EAPI system. In an alternate embodiment, the promotion system is integrated with the EAPI system.

The EAPI system may identify and distinguish a customer as an influencer and/or early adopter for the merchant and/or the promotion system. The EAPI system may analyze the customers of the merchant and/or the promotion system (separately or in combination). The EAPI system may determine an effect of a specific customer to influence other customer's behavior (such as to influence other customers vis-à-vis the merchant (e.g., the specific customer to influence other customers to purchase from the merchant) and/or to influence other customers vis-à-vis the promotion system (e.g., the specific customer to influence other customers to purchase from the promotion system)). For example, the EAPI system may determine that a customer of a merchant and the promotion system is an influencer for other customers to purchase from the merchant, although the customer is not an influencer for other customers to purchase deals from the promotion system. In this example, the offer of the promotion to the specific customer may provide an added benefit to the merchant (such as in terms of motivating other customers to shop at the merchant without the promotion system). As another example, the EAPI system may determine that the customer of the merchant and the promotion system is an influencer for other customers to purchase from both the merchant and the promotion system. In this example, the offer of the promotion to the specific customer may provide an added benefit to the promotion system (such as in terms of motivating other customers to shop at the promotion system). The influence ranking component 142 may include a merchant influencer ranking component and a promotion system influencer ranking component, and the early adoption ranking component 144 may include a merchant early adoption ranking component and a promotion system early adoption ranking component. The EAPI system may identify (e.g., rank) the customer using a merchant influencer ranking and/or a merchant early adopter ranking and a promotion system influencer ranking and/or a promotion system early adopter ranking.

The EAPI system and/or the promotion system may use the rankings to determine an effective cost of a deal to the merchant based on the expected rate of return for the customer based on the influencer ranking threshold and/or the early adopter ranking threshold. The EAPI system and/or the promotion system may present deals for the merchant to offer customers that satisfy an effective cost of the deal desired by the merchant. For example, the merchant may agree to offer deals generated by the promotion system to customers determined to provide a neutral effective cost (e.g., the deal costs $20 and based on the influencer ranking threshold and/or the early adopter ranking threshold of the customer the customer is expected to return at least $20 in revenue to the merchant).

The EAPI system and/or the promotion system may offer a lower cost for the deal (e.g., $15 instead of $20) to the merchant where the customer satisfies the merchant influencer ranking and/or the merchant early adopter ranking and the promotion system influencer ranking and/or the promotion system early adopter ranking (so that both the merchant and the promotion system realize an expected return for offering the deal to the customer).

The EAPI system may determine for a merchant, for each customer identified meeting or exceeding the early adopter threshold, a multiple of the return on investment (ROI) realized by one or more advertising methods. For example, a deal that costs the merchant Y dollars offered to a customer identified as an early adopter may return a factor of N dollars of revenue that the merchant would otherwise realize by advertising. In this way, the EAPI system provides the merchant the option to offer deals to early adopters that satisfy the advertising goals (e.g., advertising budget and ROI requirements) of merchants by meeting or exceeding the early adopter threshold, even in those instances where the customer may not meet or exceed the influencer threshold.

In one implementation, targeting the customers identified as influencers with deals over the customers identified as early adopters may determine the success or failure of the campaign. In the event the targeting strategies are unbalanced in terms of the perceived benefits for the influencers and early adopters may result in campaign failures. For example, saturation of the market by a handful of influencers (e.g., users with a large number of followers that propagates and most likely to make the campaign viral) may leave no room offering early adopters special benefits (e.g., deals), result in dejecting early adopters, and cause a potential decrease in the number of customers needed to take the campaign into the mainstream.

The EAPI system may determine for a merchant, for each customer identified by the EAPI system that meet or exceed the influencer threshold, a multiple of the return on investment for each deal offered to the customer. For example, the EAPI system may offer a deal to a customer identified as an influencer that the EAPI system determines an expectation to provide a return factor of N dollars multiplied by the number of additional customers realized by the merchant by offering the influencer the deal.

The EAPI system may determine the return on investment for the various permutations for each customer of early adopter and influencer including the return for customers identified as early adopters and influencers, identified as early adopters, identified as influencers only, and neither early adopter nor influencer.

Figure 3:
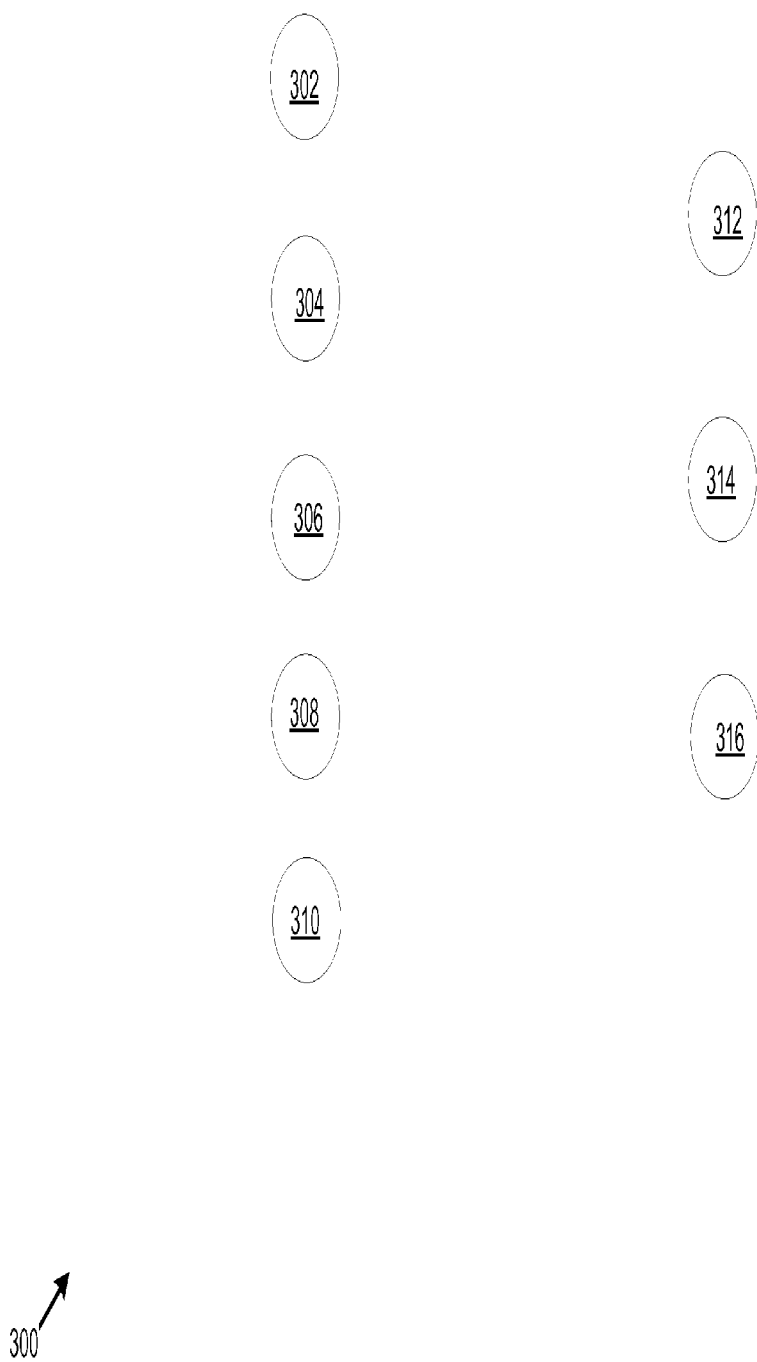
FIG. 3 shows customers and merchants as nodes of a transactional network.

FIG. 3 shows customers (302, 304, 306, 308, 310) and merchants (312, 314, 316) as nodes of a transactional network 300. The EAPI system determines the baseline network $G_{c,0}$ that corresponds to the transactions network. The EAPI system computes the final score for customer $c_1$. The EAPI system creates the network by placing a bi-partite graph using customers and merchants, as shown in FIG. 3 as node 302 associated with customer $c_1$.

The EAPI system analyzes the set of transactions as tuples $T=\{(c_1, m_1, t_1), (c_1, m_3, t_2), (c_2, m_3, t_3), (c_3, m_1, t_4), (c_4, m_1, t_5), (c_5, m_2, t_6), (c_6, m_1, t_7)\}$. The EAPI system uses tuples to represent the most basic definition of transactions, and the whole algorithm can be extended by using the transaction amount. The set of customers include $C=\{c_1, \ldots, c_6\}$ and the set of merchants include $M=\{m_1, m_2, m_3\}$, the transaction timestamps include $t_1, \ldots, t_7$, where for example $t_1 < \ldots < t_7$. The EAPI system analyzes the information related to the distance matrix $\{d_{ij}\}$, $i \in \{1, \ldots, 6\}$, $j \in \{1, 2, 3\}$ with the walking distance from each customer to each merchant, and a matrix $\{r_{ij}\}$, $i \in \{1, \ldots, 6\}$, $j \in \{1, 2, 3\}$ with the number of check-ins using a social network from each customer in each merchant. These values are referred to above as features in the set V for other types of information relevant for computing the degree of early adoption and influence of the user (e.g., customer).

Recalling the logic flow of FIG. 2, for each customer, the EAPI system generates several transactional networks, and computes for each network centrality measures. The EAPI system aggregates the centrality measures per network using an information fusion strategy. The EAPI system may base these measures on a wide range of options as discussed above. The EAPI system may aggregate the computed metrics into one final score that represents each customer's score (e.g., the influence and early adoption ranking which may include multiple components, including an influence ranking component and an early adoption ranking component).

Figure 4:
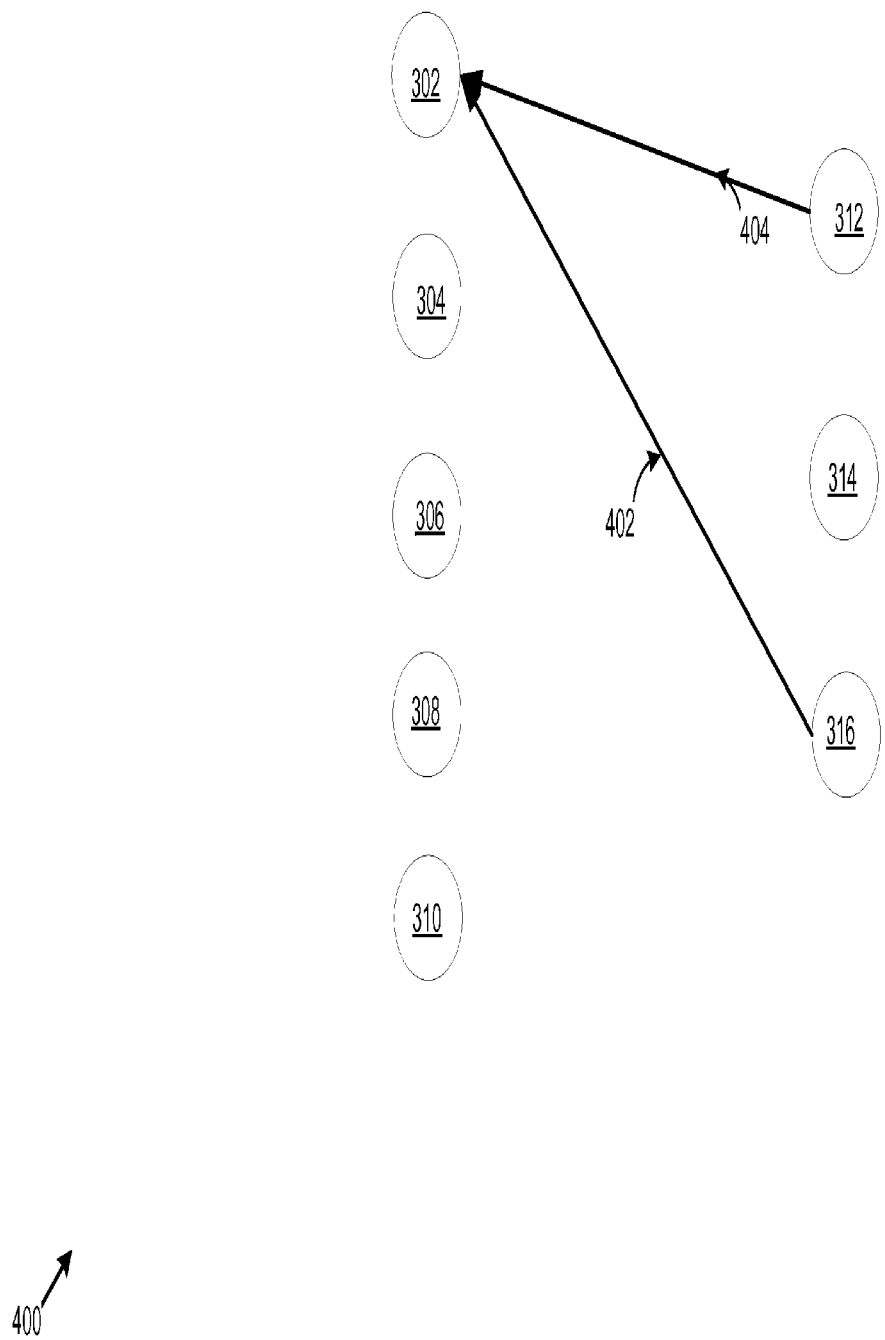
FIG. 4 shows transactions for a customer $c_1$ located at merchants $m_1$ and $m_3$.

FIG. 4 shows transactions 400 for a customer $c_1$ 302 located at/with one or more merchants, such as $m_1$ 312 and $m_3$ 316. The EAPI system places the transactions (402, 404) for customer $c_1$ 302 in the network.

Figure 5:
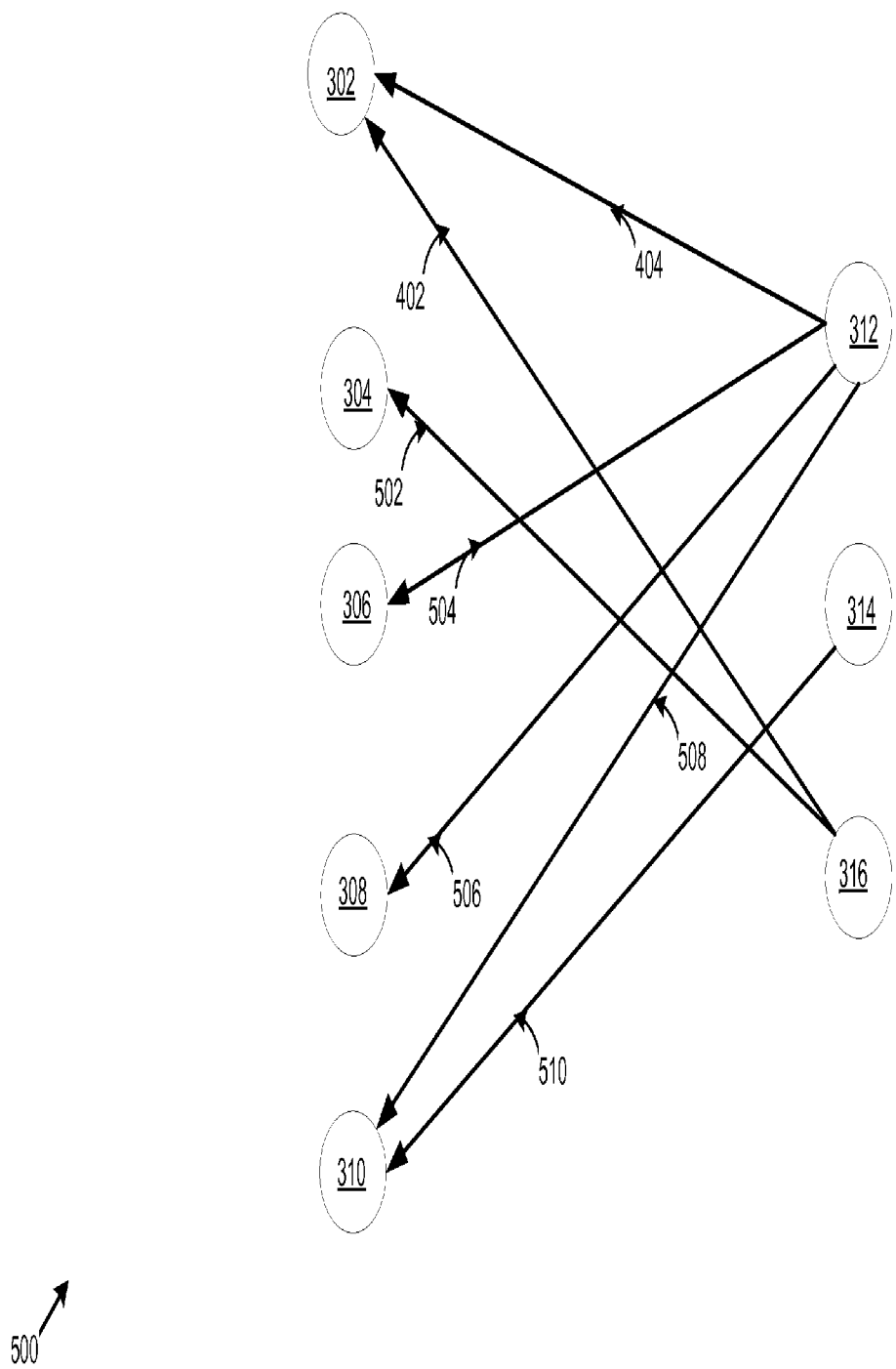
FIG. 5 shows transactions for multiple customers located at multiple merchants.

FIG. 5 shows transactions 500 for multiple customers located at multiple merchants $m_1$ 312, $m_2$ 314 and $m_3$ 316. Once the EAPI system places the customer $c_1$ 302 and the transactions (402, 404) of the customer $c_1$ 302 in the network, the EAPI system incorporates into the network transactions (502, 504, 506, 508, 510) from other customers (304, 306, 308, 310) that occurred after the transactions (402, 404) of customer $c_1$ 302.

Once the EAPI system builds (e.g., generates) the network for node $c_1$ 302, the EAPI system computes centrality values. The EAPI system executes n algorithms that provide the results for node $c_1$ 302 that include $S_0 = \{s_{0,1}, \ldots, s_{0,n}\}$. The EAPI system may use an information fusion technique represented by the function $F_s$ to determine the score for $c_1$ 302 in the baseline transactional network as $S_{0,c1} = F_s(s_{0,1}, \ldots, s_{0,n})$.

The EAPI system, for the following networks, then considers the adjacency matrices available for the social network check-ins and the walking distance information. The EAPI system may build a complete bi-partite graph by analyzing the values from both matrices as the weights for each network edge. The EAPI system may build (e.g., generate) networks $G_{c1,v1}$ and $G_{c1,v2}$, where for each network, the EAPI system determines $n_{v1}$ and $n_{v2}$ different centrality measures for customer $c_1$ 302. The EAPI system determines a set of scores $S_1 = \{s_{1,1}, \ldots, s_{1,nv1}\}$ and $S_2 = \{s_{2,1}, \ldots, s_{2,nv2}\}$. The EAPI system may then use an information fusion technique represented by the functions $F_{s,v1}$ and $F_{s,v2}$ to determine the score for customer $c_1$ 302 in both networks as $S_{1,c1} = F_{s,v1}\{s_{1,1}, \ldots, s_{1,n}\}$ and $S_{2,c1} = F_{s,v2}\{s_{2,1}, \ldots, s_{2,n}\}$.

The EAPI system determines the final score for customer $c_1$ 302 by aggregating the previous scores with a new information fusion technique represented by function $F_g$, so that $S_{c1} = F_g(S_{0,c1}, S_{1,c1}, S_{2,c1})$. The EAPI system repeats the process for each customer, and determines the final list of ranked customers by using scores $S_{c1}, \ldots, S_{c5}$.

Figure 6:
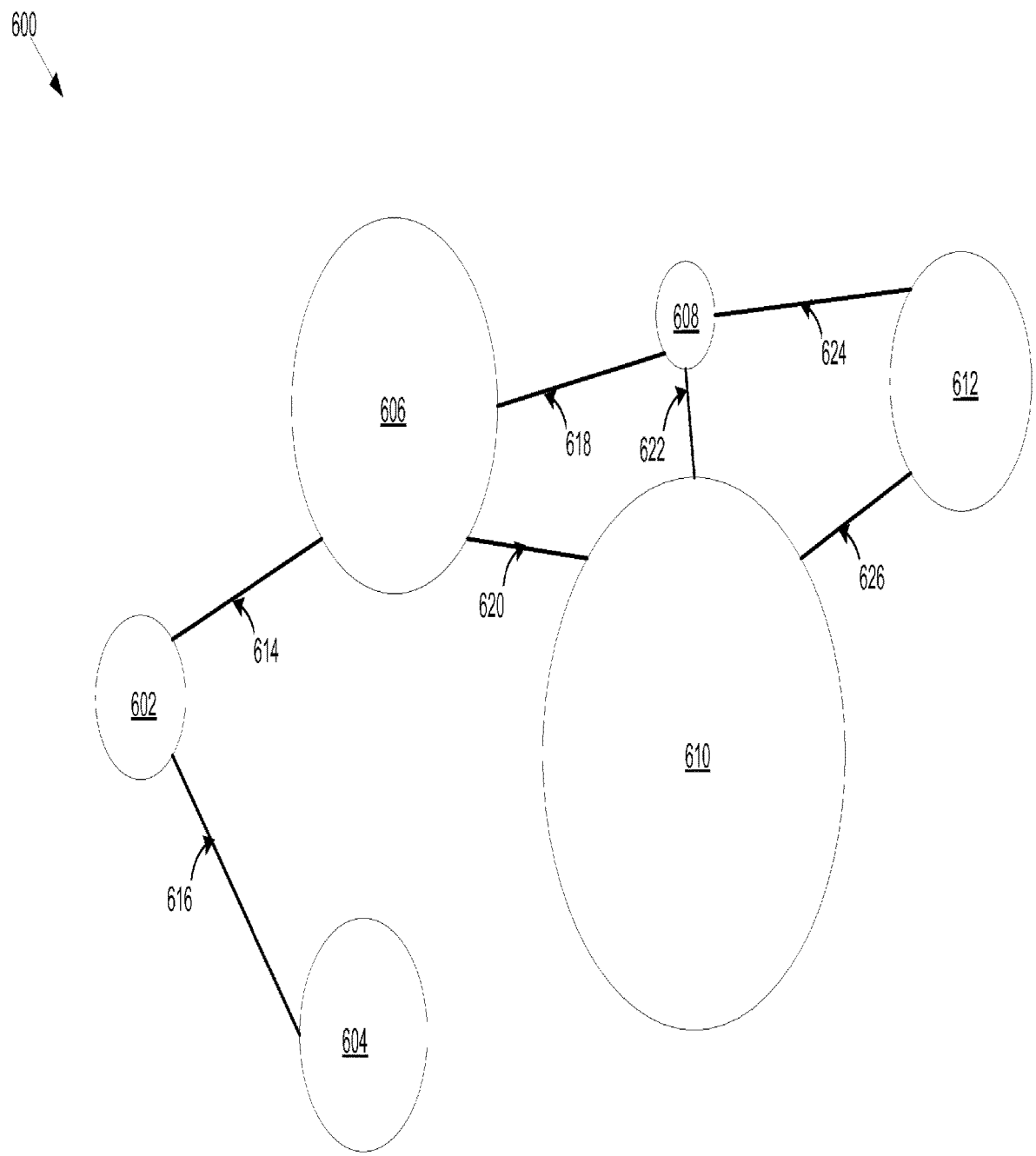
FIG. 6 shows networked nodes of degrees of influence of customers.

FIG. 6 shows networked nodes 600 of degrees of influence of customers. The degrees of influence of customers (602, 604, 606, 608, 610). The degrees of influence of customers (602, 604, 606, 608, 610) may be represented by the size (e.g., larger the nodes the greater the influence) and/or color of the nodes in the network. The proximity of the nodes to each other may further indicate the degree of influence of the customers, as represented by the length of the lines (614, 616, 618, 620, 622, 624, 626) between the nodes. For example, the shorter the length of the line between customer nodes the stronger the influence of the customer node represented by the larger size of the node.

Figure 7:
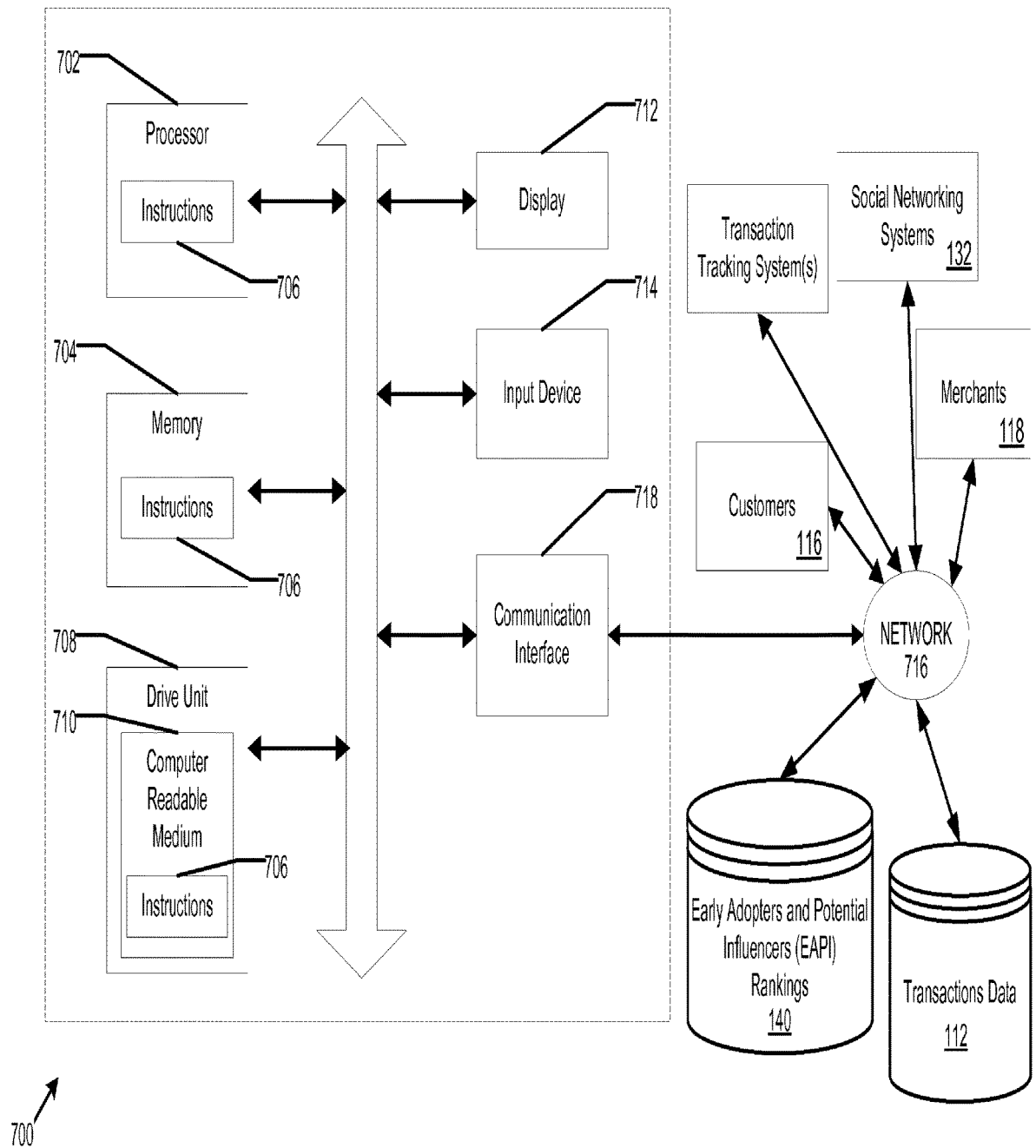
FIG. 7 shows other components of the EAPI system configuration.

FIG. 7 shows other components of the system configuration. The EAPI system may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (FDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 702, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory 704 that can communicate via a bus. The memory may be a main memory, a static memory, or a dynamic memory. The memory may include, but may not be limited to computer readable 710 storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions 706 executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 712, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit 708.

Additionally, the computer system may include an input device 714 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, may be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network 716 may communicate voice, video, audio, images or any other data over the network. Further, the instructions may be transmitted or received over the network via a communication interface 718. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method comprising:
receiving a set of transactional data associated with a plurality of merchants and a plurality of customers, the set of transactional data comprising a plurality of ordered lists of elements, each ordered list of elements defining a selected transaction of a plurality of transactions, the ordered list of elements comprising a customer, a merchant and a timestamp;
receiving social data associated with the plurality of customers via an application programming interface;
for each customer of the plurality of customers, generating, via a processor, one or more networks,
wherein generation of each network of the one or more networks is performed by:
(1) determining transaction data for a selected customer of the plurality of customers;
(2) determining one or more transaction merchants with whom the selected customer has transacted based on the transaction data; and
(3) computing a set of additional customers, each of which having subsequently transacted with the one or more transaction merchants with whom the selected customer transacted with,
wherein each network comprises one or more merchant nodes, a plurality of customer nodes, one or more merchant-customer edges between at least one of the one or more merchant nodes and at least one of the plurality of customer nodes, one or more customer-customer edges between two or more customer nodes of the plurality of customer nodes, and a plurality of weight values each associated with at least one of the merchant-customer edges or the one or more customer-customer edges, wherein the plurality of weight values are derived based at least in part on the social data;
generating, via the processor, a network ranking of a particular customer node of the plurality of customer nodes based at least in part on a centrality of the particular customer node within at least one of the one or more networks, and wherein the centrality is determined at least in part based on the plurality of weight values; and utilizing the network ranking of the particular customer node to determine whether to transmit a promotion to the selected customer,
wherein utilization of the network ranking of the particular customer node to determine whether to transmit the promotion to the selected customer comprises:
determining if the network ranking of the particular customer node meets a predetermined threshold; and
in an instance in which the particular customer node satisfies the predetermined threshold, transmitting the promotion.

2. The method of claim 1, wherein the one or more merchant nodes identify each of the one or more transaction merchants with whom the selected customer has transacted.

3. The method of claim 1, wherein each of the plurality of customer nodes include a node identifying one or the set of additional customers.

4. The method of claim 1, wherein the one or more merchant-customer edges are defined based on a first transaction occurring between the merchant and the customer as indicated in the transactional data.

5. The method of claim 1, wherein the one or more customer-customer edges are defined based on each of the two or more customer nodes being associated with at least one transaction with a same particular merchant.

6. The method of claim 1, further comprising:
computing centrality measures for one or more of the plurality of customer nodes from the transactional data;
classifying customers into different segments by applying data clustering strategies and pattern recognition algorithms on the transactional data; and
clustering the customers according to the transactional data.

7. The method of claim 6, wherein the pattern recognition algorithms include one or more of unsupervised learning, semi-supervised learning, supervised learning, reinforcement learning, association rules learning, Bayesian learning, and solving for probabilistic graphical models.

8. The method of claim 1, further comprising:
distinguishing, using a general object ranking algorithm, between different objects within a given one of the one or more networks, wherein the different objects include nodes of the given network;
computing linking analysis measures for the customers and the merchants;
identifying a set of most influential customers among the plurality of customers; and
transmitting a promotion to the set of most influential customers.

9. A computer program product comprising at least one non-transitory computer-readable storage medium having computer-executable program code instructions stored therein, the computer-executable program code instructions comprising program code instructions for:
receiving a set of transactional data associated with a plurality of merchants and a plurality of customers, the set of transactional data comprising a plurality of ordered lists of elements, each ordered list of elements defining a selected transaction of a plurality of transactions, the ordered list of elements comprising a customer, a merchant and a timestamp;
receiving social data associated with the plurality of customers via an application programming interface;
for each customer of the plurality of customers, generating, via a processor, one or more networks,
wherein generation of each network of the one or more networks is performed by:

(1) determining transaction data for a selected customer of the plurality of customers;
(2) determining one or more transaction merchants with whom the selected customer has transacted based on the transaction data; and
(3) computing a set of additional customers, each of which having subsequently transacted with the one or more transaction merchants with whom the selected customer transacted with,
wherein each network comprises one or more merchant nodes, a plurality of customer nodes, one or more merchant-customer edges between at least one of the one or more merchant nodes and at least one of the plurality of customer nodes, one or more customer-customer edges between two or more customer nodes of the plurality of customer nodes, and a plurality of weight values each associated with at least one of the merchant-customer edges or the one or more customer-customer edges, wherein the plurality of weight values are derived based at least in part on the social data;
generating, via the processor, a network ranking of a particular customer node of the plurality of customer nodes based at least in part on a centrality of the particular customer node within at least one of the one or more networks, and wherein the centrality is determined at least in part based on the plurality of weight values; and
utilizing the network ranking of the particular customer node to determine whether to transmit a promotion to the selected customer,
wherein utilization of the network ranking of the particular customer node to determine whether to transmit the promotion to the selected customer comprises:
determining if the network ranking of the particular customer node meets a predetermined threshold; and
in an instance in which the particular customer node satisfies the predetermined threshold, transmitting the promotion.

10. The computer program product of claim 9, wherein the one or more merchant nodes identify each of the one or more transaction merchants with whom the selected customer has transacted.

11. The computer program product of claim 9, wherein each of the plurality of customer nodes include a node identifying one or the set of additional customers.

12. The computer program product of claim 9, wherein the one or more merchant-customer edges are defined based on a first transaction occurring between the merchant and the customer as indicated in the transactional data.

13. The computer program product of claim 9, wherein the one or more customer-customer edges are defined based on each of the two or more customer nodes being associated with at least one transaction with a same particular merchant.

14. The computer program product of claim 9, wherein the computer-executable program code instructions further comprise program code instructions for:
computing centrality measures for one or more of the plurality of customer nodes from the transactional data;
classifying customers into different segments by applying data clustering strategies and pattern recognition algorithms on the transactional data; and
clustering the customers according to the transactional data.

15. The computer program product of claim 9, wherein the computer-executable program code instructions further comprise program code instructions for:

distinguishing, using a general object ranking algorithm, between different objects within a given one of the one or more networks, wherein the different objects include nodes of the given network;

computing linking analysis measures for the customers and the merchants;

identifying a set of most influential customers among the plurality of customers; and transmitting a promotion to the set of most influential customers.

16. An apparatus comprising at least one processor and at least one memory including computer program code, the at least one memory and the computer program code configured to, with the processor, cause the apparatus to at least:

receive a set of transactional data associated with a plurality of merchants and a plurality of customers, the set of transactional data comprising a plurality of ordered lists of elements, each ordered list of elements defining a selected transaction of a plurality of transactions, the ordered list of elements comprising a customer, a merchant and a timestamp;

receive social data associated with the plurality of customers via an application programming interface;

for each customer of the plurality of customers, generate, via a processor, one or more networks, wherein generation of each network of the one or more networks is performed by:

(1) determining transaction data for a selected customer of the plurality of customers;

(2) determining one or more transaction merchants with whom the selected customer has transacted based on the transaction data; and (3) computing a set of additional customers, each of which having subsequently transacted with the one or more transaction merchants with whom the selected customer transacted with, wherein each network comprises one or more merchant nodes, a plurality of customer nodes, one or more merchant-customer edges between at least one of the one or more merchant nodes and at least one of the plurality of customer nodes, one or more customer-customer edges between two or more customer nodes of the plurality of customer nodes, and a plurality of weight values each associated with at least one of the merchant-customer edges or the one or more customer-customer edges, wherein the plurality of weight values are derived based at least in part on the social data;

generate, via the processor, a network ranking of a particular customer node of the plurality of customer nodes based at least in part on a centrality of the particular customer node within at least one of the one or more networks, and wherein the centrality is determined at least in part based on the plurality of weight values; and utilize the network ranking of the particular customer node to determine whether to transmit a promotion to the selected customer, wherein utilization of the network ranking of the particular customer node to determine whether to transmit the promotion to the selected customer comprises:

determine if the network ranking of the particular customer node meets a predetermined threshold; and in an instance in which the particular customer node satisfies the predetermined threshold, transmit the promotion.

17. The apparatus of claim 16, wherein the one or more merchant nodes identify each of the one or more transaction merchants with whom the selected customer has transacted.

18. The apparatus of claim 16, wherein each of the plurality of customer nodes include a node identifying one or the set of additional customers.

19. The apparatus of claim 16, wherein the one or more merchant-customer edges are defined based on a first transaction occurring between the merchant and the customer as indicated in the transactional data.

20. The apparatus of claim 16, wherein the one or more customer-customer edges are defined based on each of the two or more customer nodes being associated with at least one transaction with a same particular merchant.

\* \* \* \* \*